United States Patent
Shoval et al.

(10) Patent No.: US 7,844,592 B2
(45) Date of Patent: Nov. 30, 2010

(54) ONTOLOGY-CONTENT-BASED FILTERING METHOD FOR PERSONALIZED NEWSPAPERS

(75) Inventors: Peretz Shoval, Omer (IL); Bracha Shapira, Beer Sheva (IL); Veronica Maidel, Rishon Letzion (IL)

(73) Assignee: Deutsche Telekom AG, Bonn (DE)

( * ) Notice: Subject to any disclaimer, the term of this patent is extended or adjusted under 35 U.S.C. 154(b) by 423 days.

(21) Appl. No.: 12/123,665

(22) Filed: May 20, 2008

(65) Prior Publication Data

US 2008/0294628 A1    Nov. 27, 2008

(30) Foreign Application Priority Data

May 24, 2007    (IL) .................................... 183391

(51) Int. Cl.
    *G06F 17/30*    (2006.01)
(52) U.S. Cl. .................. 707/706; 723/726; 723/728; 723/749; 723/754
(58) Field of Classification Search ............. 707/3, 707/7, 104.1, 706, 723, 726, 728, 749, 754
    See application file for complete search history.

(56) References Cited

U.S. PATENT DOCUMENTS

| | | | | |
|---|---|---|---|---|
| 6,202,058 | B1 * | 3/2001 | Rose et al. ............ | 706/45 |
| 2002/0013735 | A1 * | 1/2002 | Arora et al. ........... | 705/26 |
| 2002/0078090 | A1 * | 6/2002 | Hwang et al. .......... | 707/513 |
| 2002/0173971 | A1 * | 11/2002 | Stirpe et al. ........... | 705/1 |
| 2005/0065982 | A1 * | 3/2005 | Bailey et al. .......... | 707/104.1 |
| 2005/0234888 | A1 * | 10/2005 | Bailey et al. .......... | 707/3 |
| 2009/0234784 | A1 * | 9/2009 | Buriano et al. ........ | 706/12 |
| 2010/0057556 | A1 * | 3/2010 | Rousso et al. ......... | 705/14.44 |
| 2010/0223261 | A1 * | 9/2010 | Sarkar ................... | 707/726 |

FOREIGN PATENT DOCUMENTS

EP    1524611    4/2005

OTHER PUBLICATIONS

Savia, E. et al: "Metadata based matching . . . Profiles"; Proceeds of Finnish artificial intelligence conf., 1998; XP002492087.
Jokele S. et al: "The Role of Structured . . . Service"; Jan. 3, 2001, pp. 2525-2534, XP010549883.

(Continued)

*Primary Examiner*—Don Wong
*Assistant Examiner*—Hanh B Thai
(74) *Attorney, Agent, or Firm*—Roach Brown McCarthy & Gruber, P.C.; Kevin D. McCarthy

(57) ABSTRACT

The invention is an ontological-content-based method for filtering and ranking the relevancy of items. The filtering method of the invention utilizes a hierarchical ontology, which considers the distance, or similarity between concepts representing each user to concepts representing each item, according to the position of related concepts in the hierarchical ontology. Based on that, the filtering algorithm computes the similarity between the items and users and rank-orders the items according to their relevancy to each user. The method finds general use in the fields of information filtering and publishing, specifically the production of electronic newspapers for which the invention provides methods of filtering and ranking the relevance of news content to specific readers in order to allow production of personalized electronic newspapers.

5 Claims, 1 Drawing Sheet

OTHER PUBLICATIONS

Gauch, S. et al: "Ontology-based personalized search & browsing" Web Intelligence and agend systgems, Amsterdam Press, vol. 1, No. 3-4, pp. 219-234, XP002319079.

Hanani, U. et al., 2001. "Information filtering: overview of issues, research and systems". User Modeling and User-Adapted Interaction (UMUAI), vol. 11 (3), pp. 203-259.

Le Meur, L. et al. 2004 Guidelines, Int'l Press Telecomm. Council http://www.newsml.org/IPTC/NewsML/1.2/documentation/NewsML_1.2- doc-Guidelines_1.00 pdf.

Magnini, B. et al., 2001, "Improving user modelling . . . ". Proc. of First Inter. Conf. on Knowledge Capture, 100-107, Victoria, British Columbia, Canada.

Middleton, S. E.et al., 2001, "Capturing knowledge of user preferences . . . ". Proc. of First Int'l Conf. on Knowledge Capture, 100-107, Victoria, British Columbia, Canada.

Puustjarvi, J., & Yli-Koivisto, J. 2001. "Using metadata in electronic publishing". Project wesite: http://www.soberit.hut.fl/comet/.

\* cited by examiner

ONTOLOGY-CONTENT-BASED FILTERING METHOD FOR PERSONALIZED NEWSPAPERS

FIELD OF THE INVENTION

The invention is related to the fields of information filtering and publishing. Specifically the invention relates to the field of production of electronic newspapers. More specifically the invention relates to methods of filtering and ranking the relevance of news content to specific readers in order to allow production of personalized electronic newspapers.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

Content-based filtering deals with comparing representations of the content of items (e.g. documents, news) with representations of users' (readers of the items) interests, in order to find the items that are most relevant to each user [1]. This poses a task of finding the best representation for both the items (item profile) and the users (user profile). A user profile represents a mapping of the actual user's interest to a compact model space, which approximates the user's actual real world interests. A user's profile and an item's profile should share a common method of representation (for example, representation by keywords) in order to enable matching between the profiles. The output of the matching process is expressed as a ranking score, indicating the similarity between the user's profile and a given item.

The content-based filtering approach is based on the information retrieval domain and employs many of the same techniques. However, information filtering differs from information retrieval in the representation of the users' interests. Instead of using ad-hoc queries, as in information retrieval, the filtering system tries to model the users' long-term interests in a form of user profiles. User profiles, as well as item profiles, may consist of sets of terms. The filtering system selects and rank-orders items based on the similarity of their profiles to the user's profile.

The relevancy of items read by a user can be rated by explicit or implicit user feedback. Explicit feedback requires the user to express the degree of relevancy of a read item, while in implicit feedback the relevancy of an item to the user is inferred by observing the user's actions, e.g. reading time. Implicit feedback may be more convenient for the user but more difficult to implement and less accurate. User feedback enables the user's profile to be updated according to what she actually read, liked or disliked.

There exist two main approaches in filtering: content-based filtering and collaborative filtering. In collaborative filtering, the system selects and rank-orders items for a user based on the similarity of the user to other users who read/liked similar items in the past. In content-based filtering, the system selects and rank-orders items based on content, i.e., on the similarity of the user's profile and the items' profiles.

A major advantage of content-based filtering is that users can get insight into the motivation why the system considers that items are interesting for them since the content of each item is known from its representation. Content-based filters are less affected by problems of collaborative filtering systems, such as "cold start" and scarcity: If a new item is added to the database, it cannot be recommended to a user by a collaborative filter before enough users read/rate it. Moreover, if the number of users is small relative to the volume of items in the system, there is a danger of the coverage of ratings becoming very sparse, thinning the collection of recommendable items. For a user whose tastes are unusual, compared to the rest of the population, the system will not be able to locate users who are particularly similar, leading to poor recommendations But content-based filtering has disadvantages too:

1. Keyword-based content filtering focus on content similarity among items. This approach, however, is incapable of capturing more complex relationships at a deeper semantic level based on different types of attributes associated with structured objects of the text. Consequently, many items are missed and many irrelevant items are retrieved.
2. Unlike humans, content-based techniques have difficulty in distinguishing between high quality and low quality information, since both good and bad information might be represented by the same terms. As the number of items increases, the number of items in the same content-based category increases too, further decreasing the effectiveness of content-based approaches.
3. Content-based methods require analyzing the content of the document, which is computationally expensive and even impossible to perform on multimedia items, which do not contain text.

To expand the first point of the disadvantages, it can be added that there is a tremendous diversity in the words people use to describe the same concept (synonymy), and this places strict and low limits on the expected performance of keyword systems. If the user uses different words from the organizer (indexer) of the information, relevant materials might be missed. On the other hand, the same word can have more than one meaning (homonyms), leading to irrelevant materials being retrieved. This disadvantage is added to the fact that the basic models of content-based filtering assume a representation of documents as sets or vectors of index-terms, and typically employ only primitive search strategies based solely on the occurrence of string sequences (term) or combinations of terms.

In order to generate a representation for an item in a traditional content-based filtering method, the item has to be analyzed, possibly with a text classification algorithm, which extracts keywords/terms representing the item's content in the best way. This is one major drawback of content-based filtering, since this kind of representation causes ambiguity problems.

One way of dealing with the ambiguity is using ontology, which consists of a controlled vocabulary of terms or concepts, and semantic relationships among them. An ontology can bridge the gap between the user profile's terms and the terms used to represent the items. An ontology can be organized in a hierarchy of terms/concepts, according to their meaning.

An example of a domain ontology, that, as will be described herein, is used in this invention, is IPTC News-Codes [2], constructed from the subjects that can be associated with News items. This is a 3-level hierarchical ontology of concepts targeted to News description, currently containing approximately 1,400 concepts. A first level concept of NewsCodes is called Subject; a second level—SubjectMatter, and a third, most specific level—SubjectDetail. FIG. 1 is an example of IPTC NewsCodes ontology.

The use of conceptual modeling in general, and ontology in particular, was initially incorporated by researchers with the intention to increase the accuracy of content-based filtering compared to traditional keyword-based methods. Ontological and conceptual modeling was used in order to extract user profiles, such as the four-level ontology used in the Quickstep system [4]. Another user-profile acquisition method exploiting conceptual modeling was presented in SiteIF system [3]. One of the first hierarchical representations for describing documents and user profiles, by attaching metadata to each document and using the same method to generate a compatible representation of users' interests was presented in [6]. Another work that used ontology for content-based retrieval was the electronic publishing system CoMet [5].

It is a purpose of the present invention to provide a novel ontology-based method of filtering and ranking the relevance of items to specific users.

It is another purpose of the present invention to provide a method that measures the similarity between items' and users' profiles in a unique way which has not been used in any other method.

It is another purpose of the present invention to provide a method of filtering and ranking the relevance of news content to specific readers in order to allow production of personalized newspapers.

Further purposes and advantages of this invention will appear as the description proceeds.

SUMMARY OF THE INVENTION

The invention is a computer based ontology-content-based filtering method for measuring the relevance and ranking content items for users in a specific application. The method comprises the steps of:
  a) selecting an ontology suitable to represent terms or concepts and semantic relationships among them that are descriptive of the application;
  b) compiling a user's content-based profile comprising descriptive attributes of the user and a list of ontology concepts representing the interests of the user selected from the selected ontology to which weights of importance of those concepts have been assigned;
  c) storing the user's content-based profile in the memory of the computer;
  d) creating an item's profile comprising descriptive attributes of the item and a set of ontology concepts which are selected from the selected ontology and which represent the content of the item;
  e) measuring the similarity between the item and the user by running a content-based algorithm that is contained in software preloaded into the computer, wherein the algorithm:
    determines the initial relevancy of an item to a user based on a "perfect match" between the item's descriptive attributes and the user's descriptive attributes;
    searches for and identifies common or related concepts in the item's profile and the user's profile;
    assigns a predetermined score of similarity for each of the common or related concepts;
    applies a predetermined algorithm to determine an overall item similarity score by combining the scores of similarity for each of the common or related concepts and the weights of the concepts in the user's profile; and
  f) using the overall item similarity score to rank order the evaluated items for the user.

The algorithm can be applied for measuring one of the following: the relevancy of a single item to a single user, or for rank ordering the relevancy of a batch of items for a single user, or for rank ordering the relevancy of a batch of users for a single item, or for rank ordering the relevancy of a batch of items for a batch of users.

In one embodiment, the method of the invention is applied to the production of personalized electronic newspapers. In this application, the selected ontology can be the three-level NewsCodes ontology.

In embodiments of the method of the invention, the concepts of the user's profile and their weights can be updated explicitly by the user or implicitly based on monitoring the items read by the user and the ontology concepts by which those items are represented.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 1:
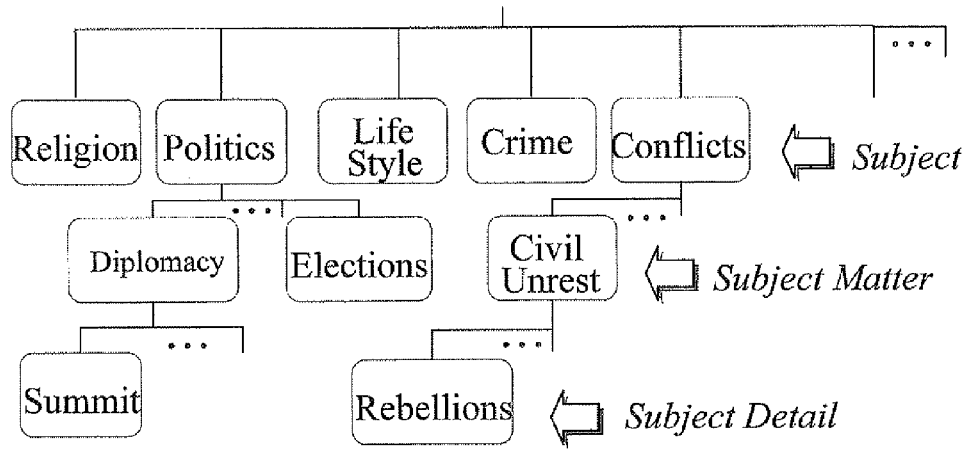
FIG. 1 is an example of an IPTC NewsCodes ontology.

Traditional content-based filtering methods usually utilize text extraction and classification techniques for building user and content (item) profiles. These methods have some disadvantages e.g. mismatch between user profile terms and item terms, leading to low performance. Some of the disadvantages can be overcome by incorporating an ontology, which enables representing both the users' interests and the items' contents with concepts taken from the same vocabulary.

The invention is an ontological-content-based method for filtering and ranking the relevancy of items. The content-based filtering method utilizes a hierarchical ontology. The method considers the distance, or similarity between concepts representing each user to concepts representing each item, according to the position of related concepts in the hierarchical ontology. Based on that, the filtering algorithm computes the similarity between the items and users and rank-orders the items according to their relevancy to each user.

The production of a personalized electronic newspaper will be described herein as an illustrative, but non-limitative example of the implementation of the method of the invention. In the Newspapers domain, ontologies have been specifically generated for news classification and concepts from them can conveniently be used to represent the contents of the News items. NewsCodes, created by the International Press Telecommunications Council (IPTC) [2], is an example of such a hierarchical ontology.

In the domain of News, instant filtering of the News items is important, and since a new item has no reading history, the method of the invention cannot rely on collaborative filtering (at least not when it is just added to the repository of news), but rather needs to rely on content-based filtering, so that once a new item arrives to the repository of News, the content-based filtering algorithm can perform the necessary matching with the users' profiles and determine the degree of relevancy of the item to the potential users. If many News items accumulate in a certain period, the content-based filtering algorithm can rank order the items according to their relevancy to each of the potential readers. The basic question that must be answered by the method is how to match and measure the distance between a user's (reader's) profile and News items' profiles that are represented with the same ontology.

The innovation of the invention is in:

Incorporation of an ontology for the News domain and exploitation of its hierarchy in the representation of user profiles and News items profiles, and in the process of matching between them; and Implementation of a novel filtering method, which considers the similarity of concepts in a user's profile to concepts representing News items, based on the distance (or closeness) of the respective concepts in the hierarchical ontology.

The filtering method was initially proposed by one of the inventors of the present invention (P. Shoval). It is based on the assumption that each News item and each user profile are represented with a set of concepts taken from the common ontology. The generation of an item's representation (i.e., the item's profile) is based on both metadata that describes the source data (the News item), and text extraction and classification techniques. (Since the generation of the items' profile is not part of this invention, it will not be further discussed herein.) The initial user's profile may be originally generated explicitly by the user who selects concepts from the ontology and assigns them weights of importance. Subsequently, the concepts and their weights are updated implicitly, based on monitoring the News items read by the user and the ontology concepts by which those items are represented. (This invention is not dependent upon how a user's profile is generated or updated, it is sufficient to know that at any point in time a user's profile contains an up-to-date weighted set of ontology concepts.)

The following are the details of the filtering method:

Representation of contents—The news item profile: An item's profile consists of:

a) Descriptive attributes, e.g., source (where item comes from), language, author, date, location (country), etc. These attributes will be used to determine if the item is relevant to a user—depending, of course, on the user's profile.

b) A set of ontology concepts that represent its content. The concepts representing an item are the most specific ones in their branch of the hierarchy. For example, if an item deals with 'sport' and specifically with 'football', it is represented with 'football' only; the ontology knows that latter is a child (subtype) of the former.

Obviously, an item may be represented with many ontology concepts; each concept may appear in any branch of the ontology hierarchy and at any level —all depending on its actual content. Note that if a certain concept is included in the item's profile, its parent and grandparent (if any) are not included in the profile, but the ontology can tell who they are. But sibling concepts may be included in the profile. For example, an item may include both 'football' and 'basketball' (both are children of 'sport'). Note that the filtering method does not assume that the concepts representing an item are weighted (although the proposed algorithm could be adjusted for such possibility).

Representation of users—The user profile: The user's content-based profile consists of:

a) Descriptive attributes, e.g.: list of newspapers (source) the user is willing to read, language(s) user can read, location (country/city), etc.—these attributes will be used to determine if an item is relevant to a user depending, of course, on the respective attributes of the item.

b) A weighted list of ontology concepts representing the user's interests. A user's profile may consist of many ontology concepts, each taken from different branches and levels of the ontology. For example, a user's profile may include 'sport' only, or 'sport' and 'football', or 'football' and 'basketball', or all the three—besides many other concepts. This means that a certain concept in an item's profile may be matched, to a certain degree, with more than one related concept in the user's profile. For example, if an item's profile includes 'football' while a user's profile includes both 'sport' and 'football', they match "perfectly" on the common concept 'football', and "partially" on the parent concept 'sport'.

As stated hereinabove, the user's content-based profile may be generated initially by the user who selects concepts from the ontology and assigns weights of importance; at any rate, the profile is updated according to implicit feedback from the user, i.e. if a user reads a News item and finds it interesting, the concepts in that item's profile will be added to the user's profile, if not there already, and the concept weights will be updated accordingly, as explained hereinbelow.

When a user reads ('clicks') a News item, the system considers the item's concepts. If a concept does not appear yet in the user's profile, it is added with 1 'click' (which indicates its initial weight). If a concept already appears in the user's profile, the numbers of its 'clicks' is increased by one. The weight of each concept in the user's profile is the number of its 'clicks' divided by the total number of 'clicks' in the user's profile.

Measuring similarity between an item and a user—the matching algorithm:

The algorithm consists of two main parts: a) preliminary test of relevancy;

b) measurement of similarity:

A. Preliminary Test of Similarity:

In this step, it is determined if the item is at all relevant for the user. The item's descriptive attributes and the user's descriptive attributes are reviewed: for each of the item's attributes there should be a match with the respective user's attribute—unless one of them is null (not relevant). For example, if the item comes from a certain newspaper (source) or is written in a certain language that is different from the user's interests, then it is not relevant and will not be examined further for that user.

B. Measurement of Similarity:

This is the main step of the matching algorithm, where it is determined to what degree the item is relevant to the user, and based on that the relevant items are rank-ordered by relevancy, as described below.

An item and a user are similar if their profiles include common, i.e. the same, concepts or related concepts, i.e. concepts having parent-child relationship. An item's profile and a user's profile may have many common or related concepts; the more such concepts, the stronger is the similarity between them. For example, assume that a user profile includes 'football' and 'sport'; this profile is similar to a certain degree to an item that includes these two concepts, it is less similar to an item that includes just 'sport', and it is more similar to an item that includes 'sport' and 'football' and 'basketball'.

In the present invention the inventors have adopted the 3-level NewsCodes ontology, so related concepts may be only one or two levels apart (parent-child or grandparent-grandchild). Note that a user's concept may be more general than an item's concept, i.e. one or two levels apart, meaning that the user has more general interests than the item. On the other hand, a user's concept may be more specific than an item's concept, i.e. one or two levels apart, meaning that the user has more specific interests than the item. In any of the above cases, if a user's profile and an item's profile do not have exactly the same concept in common, it is said that they do not match "perfectly" on that concept but rather "partially".

When dealing with a "partial" match between user and item concepts, the method should also consider their relative position in the hierarchy. The method distinguishes between cases where the user's concept is more general than the item's concept, and cases where the user's concept is more specific than the item's concept. In the first case, the user is probably interested in items that deal generally with a concept, while in the second case—in items that deal specifically with a concept. Following this assumption, the method must consider such cases differently when measuring similarity.

Figure 2:
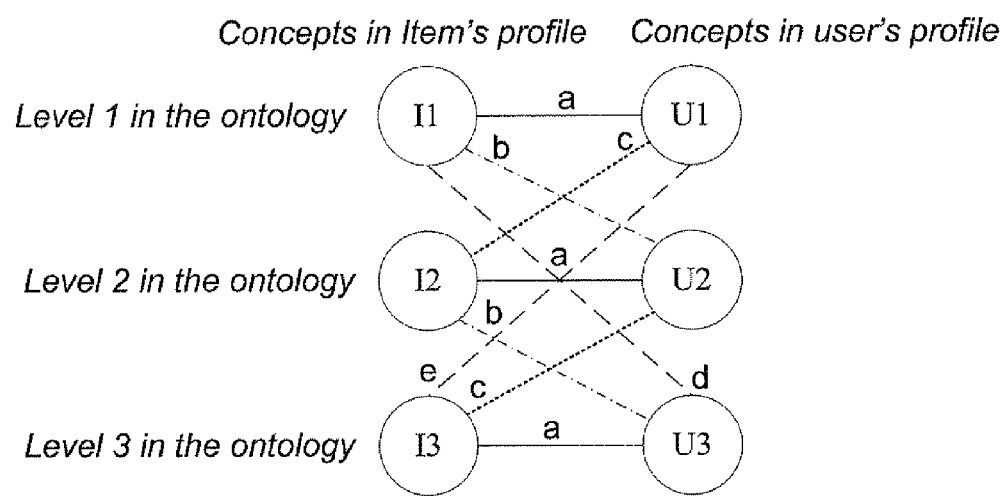
FIG. 2 shows the hierarchical similarity measure.

Scores of similarity: Based on the above, the method distinguishes between 9 different possible cases of similarity between concepts in a user's profile and concepts in an item's profile. The hierarchical similarity measure is shown in FIG. 2.

"Perfect match": Occurs when a concept appears in both the user's and the item's profile. If I1, I2, I3 denote the hierarchical level of a concept in the item's profile, and U1, U2, U3 the level of a concept in the user's profile. A "perfect match" can occur in 3 cases:

I1=U1 (e.g. item and user profiles include 'sport')
I2=U2 (e.g. item and user profiles include 'football')
I3=U3 (e.g. item and user profiles include 'World cup games')

"Close match": a concept appears only in one of profiles, while a parent or child of that concept appears in the other profile. A "close match" can occur in 2 pairs of cases:

I1=U2 (e.g. item concept is 'sport', while user concept is 'football')
I2=U3 (e.g. item concept is 'football' while user concept is 'World cup games')

In the above 2 cases, the item's concept is more general than the user's concept (1 level apart), i.e. the user interest is more precise/specific than the item.

I2=U1 (e.g. item concept is 'basketball' while user concept is 'sport')
I3=U2 (e.g. item concept is 'Euro league' while user concept is 'basketball')

In the above 2 cases, the item concept is more specific than the user concept, i.e. the user interest is more general than the item.

Note that in all the above 4 cases there may be more than one occurrence of "close match" between the concepts. For example, in the case I1=U2, assume the item's concept is 'sport' while the user's profile includes both 'football' and 'basketball'. Hence, when measuring similarity we have to examine all possible "close matches" between parent and children concepts.

"Weak match": a concept appears in one profile, while a grandparent concept or a grandchild concept appears in the other profile (concepts are 2 levels apart). A "weak match" can occur in 2 cases:

I1=U3 (e.g. item concept is 'sport' while user concept is 'World cup games')
  in this case the item is much more general than the user's interest.
I3=U1 (e.g. item concept is 'Euro league' while user concept is 'sport')—in this case the item is much more specific than the user's interest.

Note that there may be more than one occurrence of "weak match" between the concepts. For example, in the case I3-U1 the user concept is 'sport' while the item concepts include 'Euro league' and 'World cup games'.

For each of the 9 possible cases, a score of similarity is determined. In the 3 cases of "perfect match" (labeled 'a' in FIG. 2) the score is 1, i.e. maximal. In all other cases, the score should be less than 1, depending if it is a "close" or a "weak" match and on the "direction" of the relationship, i.e. whether it is from item to user or from user to item. For example, the score for the case I1=U2 (item concept is more general than user concept) may be 2/5, while the case I2=U1 (item concept is more specific than user concept) may score 2/3. The rationale for assigning a higher score in the latter case may be that in the first case the item deals with a more general concept than the user's interest, yielding lower Precision than in the other case, where the item deals with a more specific concept than the user's interest, thus yielding higher Precision.

The following is an example of a possible scoring scheme for the 9 possible cases. These scores are subject to change, based on future experience in implementation of the method:

I1=U1→1; I2=U2→1; I3=U3→1 (3 cases of "perfect match"; marked a in FIG. 2)
I1=U2→2/5; I2=U3→2/5 (2 cases of "close match"—item concept is more general; marked b)
I2=U2→2/3; I3=U2→2/3 ( 2 cases of "close match"—item concept is more specific; marked c)
I1=U3→1/3 (case of "weak match"—item concept is much more general; marked d)
I3=U1→1/2 (case of "weak match"→item concept is much more specific; marked e)

Measuring similarity between item and user—combining scores of similarity and weights of concepts: The similarity of an item's profile to a user's profile is based on the number of "perfect match", "close match" and "weak match" of concepts in the two profiles, and on the weights of the concepts in the user's profile. The overall Item Similarity score (IS) is computed as follows:

$$IS = \frac{\sum_{i \in Z} N_i \cdot S_i}{\sum_{j \in U} N_j}$$

Where:
Z—number of concepts in item's profile.
U—number of concepts in user's profile.
i—index of the concepts in item's profile.
j—index of the concepts in user's profile.
$S_i$—score of similarity, depending on whether it is a "perfect", "close" or a "weak" match of concept i to a respective concept in user's profile. (Note that in case of no match at all, $S_i$=0.)
N—number of clicks on the concept (used to determine the concepts' weights).

The matching algorithm can be applied for measuring the similarity of a single item to a single user, or for rank ordering the relevancy of a batch of items for a single user, or for rank ordering the relevancy of a batch of users for a single item, or for rank ordering the relevancy of a batch of items for a batch of users—all depending on the specific need/application. For example, to produce an individualized electronic newspaper, the algorithm is applied for rank ordering a batch of News items that have accumulated within a certain period for subscribed users, and for rank ordering items when a user asks the system to "refresh".

Since a user's profile may include many concepts, some with very low weights ('clicks') it might be worthwhile to include in the process only the most important concepts (say the top 10 concepts, or the concepts having weight above a certain threshold). The exact number of concepts can be determined by trial and error for a particular application or to meet the requirements/expectations of a particular user.

EXAMPLE

The following example demonstrates the application of the filtering method using a few simulated items' profiles and a user's profile. The calculations are based on the matching scores defined above. Note that in the item and user profiles, an arrow represents parent-child relationship and the item's profile includes only the lower-level concepts.

Items' Profiles:

| Item # | Ontology concepts representing the item |
|---|---|
| Item 1 | Crime → Laws |
|  | Unrest → Civil unrest → Social conflict |
| Item 2 | Sport → American Football |
|  | Health → Injury |
| Item 3 | Science → Natural science → Astronomy |
| Item 4 | Life style and leisure |
|  | Disaster and accident → Emergency incident |

A User's Profile:

| Ontology concepts of the user's profile | Number of Clicks (weight) |
|---|---|
| Sport | 20 |
| Health | 12 |
| Crime → Laws → Criminal | 3 |
| Unrest | 10 |
| Lifestyle and leisure → Fishing | 8 |

Calculating the scores of similarity and overall Item Similarity score yields the following rank ordered list of items:

| Item # | Ranking score |
|---|---|
| Item 2 | 0.40 |
| Item 1 | 0.11 |
| Item 4 | 0.06 |
| Item 3 | 0.00 |

It can be observed that Item 2 gets the highest score because its profile includes 'American football', a child of 'Sport' in the user's profile; and 'Injury', a child of 'Health' in the user's profile—and both concepts in the user's profile have relatively high weights. Here is the exact computation of the ranking score, assuming we consider the scoring scheme in which I2=U1→⅔:

$$IS = \frac{\frac{2}{3} \cdot 20 + \frac{2}{3} \cdot 12}{20 + 12 + 3 + 10 + 8} = 0.4$$

Item 1 gets the second highest score because of the 'close match' between its 'Laws' concept and 'Crime' in the user's profile, and also because of the 'weak match' between its 'Social conflict' concept and 'Unrest' in the user's profile. Item 1 gets a lower ranking than Item 2 because of two reasons: 1) lower scores of similarity; 2) lower weight of the matched concepts. Item 4 gets even a lower ranking because it has only one concept having any match with the user's profile: its concept 'Lifestyle and leisure' is a 'close match' with 'Fishing' in the user's profile. Item 3 gets a ranking score 0 because it has no match at all with the user's profile.

Maximizing the Effectiveness of the Filtering Method for a Specific Application

The description and example given hereinabove clearly demonstrate the framework of the method of the invention; however as already mentioned the exact details of, for example, the optimal values for the various matching scores, must be determined experimentally by actually setting up the necessary data bases in a computer and running the algorithm. Initially the algorithm will comprise a good "theoretical" estimate of the assumptions and of the values of the parameters. The results are then measured for effectiveness and the assumptions and the values of the parameters are adjusted accordingly. The process is an iterative one, which is repeated until the "best result" is obtained. This process can be carried out "off-line" to maximize the effectiveness of the filtering before the filtering method is applied "on-line", or alternately can be an ongoing process in which the results are continuously measured and the algorithm "fine-tuned" either continuously or periodically as the program is run.

The following are the assumptions and parameters that should be evaluated in order to apply the invention to a specific application:

1. Determination of the matching scores: The filtering method assumes different matching scores to the various possible types of matching between concepts in the user's profile and the item's profile: the highest score (1) is given to a "perfect" match, while a "close" match and a "weak" match get lower scores, considering also the direction of the hierarchical relation between the concepts (i.e., whether the user's concepts is more general or more specific than the item's concept). This part of the evaluation is aimed to determine the optimal scores for the different types of match.

2. Evaluation of the contribution of the various types of match between user concepts and item concepts: It is obvious that the more common concepts that appear in both the user's profile and the item's profile, and the closer the user's concepts is to the item's concepts—the more relevant the item is to the user. The question is: what is the residual contribution of the different types of match (i.e. "closeness") to the quality of the results. For example, what is the quality of results if only "perfect" matches are considered? What is the additional contribution of "close" matches? What is the additional contribution of "weak" matches? Results of these evaluations enable a determination to be made if it is worthwhile to consider all types of relatedness, or perhaps only some of them are sufficient to obtain quality results.

3. Considering more than one match between related concepts in the user's and item's profiles: A user's profile may contain concepts from various level of one branch of the hierarchy (e.g., the profile may include the concepts 'sport' and 'football'). The question is whether all concepts along the branch should be considered when compared to the item's profile, or perhaps only the concept having the highest score*weight. (Note that the score itself is determined according to the "closeness" factor, while the weight is determined according to the number of read items which included the concept).

4. Determining the number of concepts in a user's profile to consider: A user's profile may include many concepts, each having a certain weight (as explained above). Considering all concepts in the profile might be time consuming (in terms of processing time). It is likely that concepts having low weights will not contribute much to the quality of the filtering results. The contribution of low-weight concepts should be evaluated in order to determine a threshold for an optimal number of concepts or for concept weights. Initially, the algorithm will consider all concepts; then certain concepts will be omitted (beyond a certain number or below a certain weight) in order to see to what degree their absence affects performance.

Although embodiments of the invention have been described by way of illustration, it will be understood that the invention may be carried out with many variations, modifications, and adaptations, without exceeding the scope of the claims. In particular, the invention as described herein utilizes a 3-level hierarchical ontology of News. It can, however, be generalized to other domains with their specific ontologies; and it must not be restricted to three levels. Moreover, the method can be enhanced to deal not just with a hierarchical but also with a network-based (DAG) ontology, where a concept may have many parent concepts, as well as many child concepts.

BIBLIOGRAPHY

[1] Hanani, U., Shapira, B & Shoval, P. 2001. "Information filtering: overview of issues, research and systems". User Modeling and User-Adapted Interaction (UMUAI), Vol. 11 (3), pp. 203-259.

[2] Le Meur, L., & Steidl, M. 2004. NewsML™ 1.2—Guidelines V 1.00. *Int'l Press Telecommunications Council Site*. Retrieved: Dec. 7, 2006, from: http://www.newsml.org/IPTC/NewsML/1.2/documentation/NewsML_1.2doc-Guidelines_1.00 ddf

[3] Magnini, B., & Strapparava, C. 2001. "Improving user modelling with content-based techniques". Proc. of First International Conference on Knowledge Capture, 100-107, Victoria, British Columbia, Canada.

[4] Middleton, S. E., De Roure, D. C., & Shadbolt, N. R 2001. "Capturing knowledge of user preferences: ontologies in recommender systems". Proc. of First Int'l Conference on Knowledge Capture, 100-107, Victoria, British Columbia, Canada.

[5] Puustjärvi, J., & Yi-Koivisto, J. 2001. "Using metadata in electronic publishing". Project wesite: http://www.sober-it.hut.fi/comet/.

[6] Savia, E., Koskinen T. & Jokela, S. 1998. "Metadata based matching of documents and user profiles". Proc. of Finnish Artificial Intelligence Conference, STeP'98.

The invention claimed is:

1. A computer based ontology- content-based filtering method for measuring a relevance and ranking content items for users in a specific application, said method comprising the steps of:

a) selecting an ontology suitable to represent terms or concepts and semantic relationships among them that are descriptive of said application;

b) compiling a user's content-based profile comprising descriptive attributes of said user and a list of ontology concepts representing the interests of said user selected from said selected ontology to which weights of importance of those concepts have been assigned;

c) storing said user's content-based profile in the memory of said computer;

d) creating an item's profile comprising descriptive attributes of said user and a set of ontology concepts which are selected from said selected ontology and which represent the content of said item;

e) measuring a similarity between said item and said user by running a content-based algorithm that is contained in software preloaded into said computer, wherein said algorithm:

determines the initial relevancy of an item to a user based on a perfect match between said item's descriptive attributes and said user's descriptive attributes, searches for and identifies common or related concepts in said item's profile and said user's profile;

assigns a predetermined score of similarity for each of said common or related concepts;

applies a predetermined algorithm to determine an overall item similarity score by combining said scores of similarity for each of said common or related concepts and the weights of said concepts in said user's profile; and f) using said overall item similarity score to rank order the evaluated items for said user.

2. A method according to claim 1, wherein the algorithm is applied for measuring one of the following: the relevancy of a single item to a single user, or for rank ordering the relevancy of a batch of items for a single user, or for rank ordering the relevancy of a batch of users for a single item, or for rank ordering the relevancy of a batch of items for a batch of users.

3. A method according to claim 1, wherein the application is the production of personalized electronic newspapers.

4. A method according to claim 1, wherein the selected ontology is a three-level NewsCodes ontology.

5. A method according to claim 1, wherein the concepts and their weights of the user's profile are updated explicitly by the user, or implicitly, based on monitoring the items read by the user and the ontology concepts by which those items are represented.

* * * * *